US008647076B2

(12) United States Patent
Baker et al.

(10) Patent No.: US 8,647,076 B2
(45) Date of Patent: Feb. 11, 2014

(54) MULTISTAGE COMPRESSOR INSTALLATION

(71) Applicants: Robert Leroy Baker, Williamsville, NY (US); Jeffrey Charles Goodband, Niagara Falls, NY (US); Richard John Jibb, Wheatfield, NY (US); John Henri Royal, Grand Island, NY (US)

(72) Inventors: Robert Leroy Baker, Williamsville, NY (US); Jeffrey Charles Goodband, Niagara Falls, NY (US); Richard John Jibb, Wheatfield, NY (US); John Henri Royal, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 13/742,474

(22) Filed: Jan. 16, 2013

(65) Prior Publication Data

US 2013/0129531 A1    May 23, 2013

Related U.S. Application Data

(62) Division of application No. 12/490,819, filed on Jun. 24, 2009, now Pat. No. 8,376,718.

(51) Int. Cl.
F04B 23/04        (2006.01)
(52) U.S. Cl.
USPC .......................................... 417/243; 417/244
(58) Field of Classification Search
USPC ................. 417/243, 244, 266, 313; 415/177; 138/DIG. 11, DIG. 44; 454/329
See application file for complete search history.

(56) References Cited

U.S. PATENT DOCUMENTS

| 5,473,899 A | 12/1995 | Viteri |
| 5,863,186 A * | 1/1999 | Green et al. ..................... 417/53 |
| 6,547,534 B1 * | 4/2003 | Sakamoto et al. ............ 417/244 |
| 6,692,235 B2 | 2/2004 | Kolodziej et al. |
| 7,044,716 B2 | 5/2006 | Fabry |
| 7,077,190 B2 * | 7/2006 | Hayashi et al. ............... 165/159 |
| 8,376,718 B2 * | 2/2013 | Baker et al. ................... 417/243 |
| 2003/0175128 A1 | 9/2003 | Fabry |
| 2007/0065300 A1 * | 3/2007 | Mariani et al. ................ 417/243 |
| 2007/0189905 A1 * | 8/2007 | Dinsdale et al. .................. 417/2 |
| 2008/0008602 A1 * | 1/2008 | Pozivil et al. ................. 417/243 |
| 2012/0001444 A1 * | 1/2012 | Foreman .................... 294/119.1 |

FOREIGN PATENT DOCUMENTS

| GB | 2024328 | 1/1980 |
| GB | 2090631 | 7/1982 |

* cited by examiner

*Primary Examiner* — Bryan Lettman
(74) *Attorney, Agent, or Firm* — David M. Rosenblum (57) ABSTRACT

A multistage compressor installation in which compression stages utilizing centrifugal compressors are independently driven by drivers that can be electric motors configured to be controlled by a speed controller. Intercoolers are located between stages to remove the heat of compression and the stages are connected such that outlets are located opposite to inlets of the compressors and conduits connecting the intercoolers to the stages are in an in-line relationship to inhibit the formation of pressure drops between stages. The conduits connecting the stages incorporate tapered transition sections configured such that flow velocity gradually decreases towards the intercooler and gradually increases from the intercooler to the next succeeding compression stage to further inhibit pressure drops.

2 Claims, 6 Drawing Sheets

MULTISTAGE COMPRESSOR INSTALLATION

RELATED APPLICATIONS

This application is a divisional of prior U.S. application Ser. No. 12/490,819, filed on Jun. 24, 2009, which is incorporated herein by reference.

FIELD OF THE INVENTION

The present invention relates to a multistage compressor installation in which independently driven compression stages utilizing centrifugal compressors with intercoolers connected such that outlets are located opposite to inlets of the compressors and conduits connecting the intercoolers to the stages are in an in-line relationship to inhibit the formation of pressure drops between stages. More particularly, the present invention relates to such a compressor installation in which the conduits incorporate tapered transition sections configured such that flow velocity gradually decreases towards the intercooler and gradually increases from the intercooler to the next succeeding compression stage.

BACKGROUND OF THE INVENTION

Gases are compressed in many different types of industrial facilities and for a variety of purposes. For example, air is compressed, cooled and introduced into one or more distillation columns in an air separation plant. In a liquefier, a gas is compressed and sufficiently cooled to a liquid. There are many other examples of industrial facilities in which gases are compressed.

In any facility, although a single compressor stage can be used to compress the gas, more typically, the gas is compressed in multiple, sequential compressor stages. The reason for this is as the gas is compressed, its temperature rises. The elevated gas temperature requires an increase in power to compress the gas. In a typical compressor installation utilizing individual stages, each stage uses a centrifugal compressor in which gases entering an inlet to the compressor are distributed to a vaned compressor wheel that rotates to accelerate the gas and thereby impart the energy of rotation to the gas. This increase in energy is accompanied by an increase in velocity and a pressure rise. The pressure is recovered in a vaned or vaneless diffuser that surrounds the compressor wheel and functions to decrease the velocity of the gas and thereby increase the gas pressure of the compressed gas. The compressed gas is discharged by a volute of spiral-like configuration that terminates in an outlet of the compressor. The gas is therefore discharged from the outlet at right angles to the incoming gas to be compressed.

Since the gas has been compressed, its temperature has also increased. The heated compressed gas is cooled between the compressor stages by intercoolers in which the heated compressed gas cools through indirect heat exchange with a coolant, for instance, air or water.

Typically, the multistage compressor installation described above is driven by a common gearbox having an electric motor driving a bull gear that in turn drives pinions that are connected to compressor shafts that rotate the compressor wheels. Since the gas is gradually compressed from stage to stage, each compressor pinion may rotate at a different speed and torque related to the pressure rise to be accomplished in a particular stage on that pinion. This arrangement is particularly advantageous in an air separation plant in which it is desirable for a common plant design to be utilized with different gearing arrangements that can be used to meet production requirements for a particular plant. Additionally, since an air separation plant requires refrigeration that is generated by turboexpanders, the work of expansion can easily be recovered by gearing between the turboexpander and the bull gear. The disadvantage of such arrangement is that since the compression stages are arranged around the bull gear, the piping or conduits connecting the stages to the intercoolers can become quite convoluted. Each bend in the conduits results in a pressure drop due to turbulence induced in the flow by the change in direction of the gas within the bend. Additionally, the conduits lead directly to the intercoolers, a rapid increase in flow area results at the connection of the conduits to the intercooler. This rapid increase in flow area also results in a pressure drop due to the resulting turbulence that is induced into the flow. Also, mal-distributions in flow can occur in the intercooler such that not all of the heat exchange passages are utilized effectively.

Another disadvantage of the arrangement discussed above is that there are irreversible heat loses in gearboxes used in housing the bull gear and pinions. Further, since the torque is transmitted in a geared arrangement, there are certain mechanical requirements for the size of gear teeth resulting in limitations in the size of the pinions and therefore, speed that can be induced in each of the compression stages. These limitations are overcome through utilization of variable speed electric motors driving each of the compression stages individually. An example of this is shown in US Patent Application No. 2007/0189905 that is specifically designed to overcome the limitations discussed directly above. However, in this patent application, there is no appreciation of the pressure drops that can be induced due to the connection of the intercoolers with the compression stages.

As will be discussed, the present invention provides a compressor installation utilizing centrifugal compressors and interstage cooling in which each of the compressors is independently driven and positioned in a manner that incorporates low pressure drop connections between the stages and to the intercoolers located between stages.

SUMMARY OF THE INVENTION

The present invention, in one aspect, provides a multistage compressor installation that comprises two compression stages to compress a gas and an intercooler positioned between the two compression stages to remove heat of compression from the gas between the two compression stages. Each of the two compression stages comprise a centrifugal compressor and a driver configured to independently drive the centrifugal compressor of each of the two compression stages, the centrifugal compressor having an inlet surrounded by a volute and the volute having an outlet oriented so as to discharge compressed gas at right angles to the inlet. An inlet conduit connects the outlet of one of the two compression stages to the intercooler and an outlet conduit connects the intercooler to the inlet of the other of the two compression stages. The outlet of the one of the two compression stages is located substantially opposite to the inlet of the other of the two compression stages such that the inlet conduit and the outlet conduit are in an in-line relationship to inhibit pressure drop in the inlet conduit and the outlet conduit. Further, each of the inlet conduit and the outlet conduit is provided with tapered transition sections of ever increasing transverse cross-sectional area in the inlet conduit and ever decreasing transverse cross-sectional area in the outlet conduit such that flow velocity is gradually decreased in the inlet conduit and gradually increased in the outlet conduit to further inhibit pressure drops at connections between the inlet conduit and the intercooler and the outlet conduit and the intercooler.

In another aspect, the present invention provides a multi-stage compressor installation that comprises a plurality of compression stages, including at least four compression stages, to compress a gas and intercoolers positioned between the compression stages to remove heat of compression of the gas between compression stages. Each of the compression stages comprise a centrifugal compressor and a driver configured to independently drive the centrifugal compressor of each of the compression stages. The centrifugal compressor has an inlet surrounded by a volute and the volute has an outlet oriented so as to discharge compressed gas at right angles to the inlet. Pairs of conduits connect the intercoolers to the compression stages. An after-cooler is connected to a final of the compression stage and at least one of the pairs of the conduits sized longer than at least one other adjacent pair of the pairs of conduits and all of the compression stages, intercoolers and the after-cooler are substantially located in a common plane such that the compression stages, intercoolers and the after-cooler are arranged in a spiral-like configuration.

Alternatively, the compression stages can be arranged in a helical-like configuration on at least two levels. The helical-like configuration can be produced by orienting the volute of each of the compression stages such that the outlet is located above the inlet. In another alternative, four of the compression stages can be arranged in a vertical plane such that a second and a third of the compression stages are located above a first and a forth of the compression stages, respectively.

Any of foregoing arrangements can be used without the tapered transition sections connecting the compression stages to the intercoolers. However, each of the pairs of conduits can consist of an inlet conduit connected to the outlet of the preceding stage and an outlet conduit connected to the inlet of the following stage. The inlet conduit and the outlet conduit can be provided with tapered transition sections of ever increasing transverse cross-sectional area in the inlet conduit and ever decreasing transverse cross-sectional area in the outlet conduit such that flow velocity is gradually decreased in the inlet conduit and gradually increased in the outlet conduit to further inhibit pressure drops at connections between the inlet conduit and the intercooler and the outlet conduit and the intercooler.

In any embodiment of the present invention, the intercooler can have a box-like housing that encloses passages for indirectly exchanging heat of compression from compressed gas produced in the one of the two compression stages to a coolant circulating through the intercooler. Each of the tapered transition sections can be in the form of a four-sided polyhedron terminating in a rectangular transverse cross section at the connections of the inlet conduit to the intercooler and the outlet conduit and the intercooler.

Additionally, in any embodiment of the present invention, the driver can be an electric motor. Such electric motor can have a shaft directly coupled to the compressor and the motor can be configured such that speed of the electric motor is able to be controlled by a speed controller. Such an electric motor can be a permanent magnet motor.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

Reference numbers having the same description have been repeated in the Figures to avoid repetition in the explanation thereof in the following discussion.

DETAILED DESCRIPTION

Figure 1:
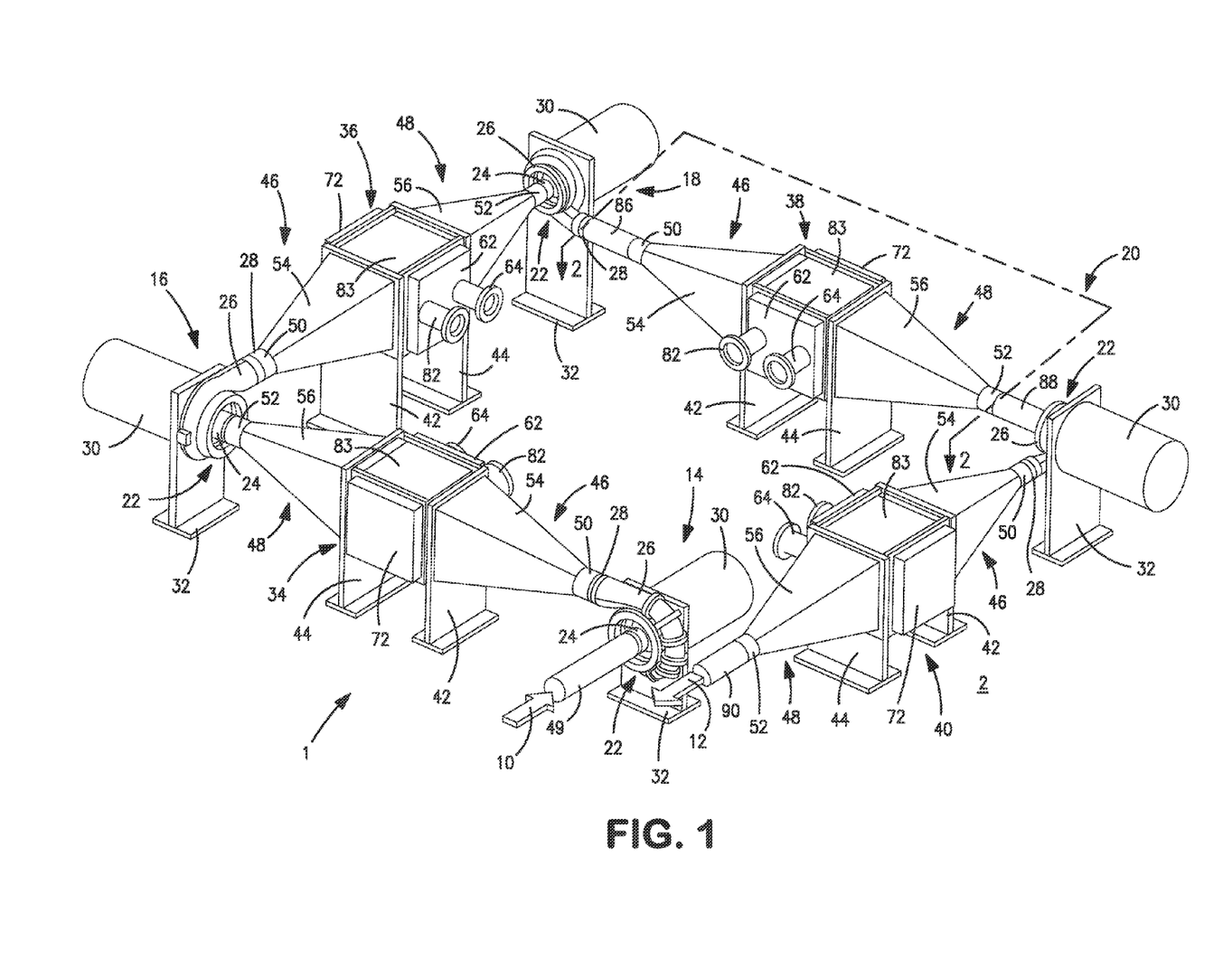
FIG. 1 is an enlarged perspective view of an embodiment of the present invention.

With reference to FIG. 1, a compressor arrangement 1 in accordance with the present invention is illustrated that is designed to compress a gas stream 10 and thereby produce a compressed gas stream 12. Gas stream 10 is compressed in four compression stages 14, 16, 18 and 20 in the production of compressed gas stream 12.

Each of the four compression stages 14, 16, 18 and 20 is provided with a centrifugal compressor 22 of known design having an inlet 24, a volute 26 and an outlet 28. Each compressor 22 may be different from one another in that they may each incorporate a design that is specifically configured to produce the desired pressure rise and an aerodynamic effect to achieve the maximum efficiency in a manner well known in the art. For example, each subsequent stage may actually be physically smaller due to the increase in the fluid density. As illustrated, each outlet 28 discharges compressed gas to the next succeeding stage at right angles to the inlet. For example, gas stream 10 enters inlet 24 of compression stage 14 and is discharged from the outlet 28 to the inlet 24 of the next succeeding stage 16 at right angles to the inlet 24 of compression stage 14. Each of the compression stages 14, 16, 18 and 20 is independently driven by a driver 30. Each drive 30 is preferably an electric motor of permanent magnet design that is capable of being controlled by a variable speed controller. Each stage 14, 16, 18 and 20 is connected to a support 32 by threaded connectors, such as bolts. Each support is in turn connected to a concrete slab 2.

It is to be noted that each of the compression stages 14, 16, 18 and 20 can be designed in a manner well known in the art. For example, each such stage is employed to increase the pressure of the gas stream 10 and as such, compression stage 14 is the first compression stage, compression stage 16 is the second compression stage, compression stage 18 is the third compression stage and compression stage 20 is the forth compression stage. The present invention encompasses compressor arrangements having at least two compression stages and also, greater than four of such compression stages. Each compression stage is designed for the pressure rise and flow that is desired in a particular stage. More latitude in the design is given the designer given the fact that preferably the speed of a driver 30 can be independently controlled for a particular stage. Also, as indicated above, each driver can be an electric motor and in particular, a permanent magnet motor directly coupled to the compressor. This being said, fluidic drives having a pump, fluid motors and steam turbines are possible substitutes for such electric motors. Additionally other types of electric motors are possible, such as induction motors and in general, electric motors that would operate at a fixed speed and geared by a gearbox to the particular compression stage. Such an arrangement would not, however, be preferred given the attendant irreversible losses in gearboxes and the reduced freedom of design in the compression stage that would otherwise be obtainable with the use of a variable speed, permanent magnet motor that could incorporate magnetic bearings to reduce irreversible thermal losses in such a device.

Between the compression stages 14 and 16, an intercooler 34 is positioned to remove the heat of compression produced by the compression of the gas stream 10 by compression stage 14. Similarly, between compression stages 16 and 18, an intercooler 36 is positioned to remove the heat of compression produced by the compression of the gas stream 10 by compression stage 16 and an intercooler 38 is provided between compression stages 18 and 20 to remove the heat of compression generated by compression stage 18. An after-cooler 40 is provided after compression stage 20 to remove the heat of compression generated by compression stage 20 and such after-cooler has the same design as intercoolers 34, 36 and 38. In this regard, other possibilities exist for the after-cooler, for example direct fluid contact devices that would not necessarily be configured in the same manner as after-cooler 40. Additionally, the box-like configuration of each of the intercoolers 34, 36 and 38 and the after-cooler 40 is illustrated for exemplary purposes only in that other configuration are also possible for such devices, for example, cylinders. Each of the intercoolers 34, 36 and 38 and after-cooler 40 are supported by supports 42 and 44 that are in turn connected to the concrete slab 2.

Each of the intercoolers 34, 36 and 38 are connected between the compression stages: 14, 16; 16, 18; and 18, 20, respectively by pairs of inlet and outlet conduits 46 and 48. Conduits 46 and 48 for each of the stages may incorporate a design that is specific for a stage. For example, pipe sizes might be small in subsequent higher pressure stages. Each of the pairs of inlet and outlet conduits 46 and 48 is formed by inlet and outlet sections 50 and 52, respectively, and inlet and outlet transition sections 54 and 56. Each of the inlet section 50 is provided with a circular transverse cross-section at its connection with an outlet 28 and a rectangular transverse cross-section at its connection with an inlet transition section 54. Similarly, each outlet section 52 has a rectangular transverse cross-section at its connection with an outlet transition section 56 and a circular transverse cross-section at its connection with an inlet 24. The compression stages 14, 16, 18 and 20 are positioned so that each outlet 26 is located opposite to an inlet 24 of a compression stage. For example, outlet 28 of compression stage 14 is located opposite to the inlet 24 of the next succeeding compression stage 16. This allows the pair of inlet and outlet conduits 46 and 48 to be in an in-line relationship or substantially an inline relationship to prevent pressure drops from being produced by bends and elbow sections of piping that would otherwise be found in the prior art. It is to be noted, that gas stream is introduced into the inlet 24 of compression stage 14 by a piping network used in the apparatus that employs the compression arrangement 1 of which a pipe 49 is illustrated.

In addition to the foregoing, pressure drops are also reduced by provision of the inlet and outlet transition sections 54 and 56. Each of the inlet sections 54 is designed so that the transverse cross-sectional area thereof increases from the outlet 28 of compression stages 14, 16 and 18 towards their respective associated intercoolers 34, 36 and 38 so that, preferably, the transverse cross-sectional areas of the inlet sections 54 at their connections to the intercoolers 34, 36 and 38 are matching. Each of the outlet sections 56 is designed so that the transverse cross-section area thereof decreases from the intercoolers 34, 36 and 38 towards the inlet 24 of their respective associated compression stages 16, 18 and 20.

Again, preferably, the transverse cross-sectional areas of the outlet section 56 at their connection to the intercoolers 34, 36 and 38 are equal. In such manner, the velocity of the flow gradually decreases as the intercoolers 34, 36 and 38 are approached and gradually increases as the inlet 24 of compression stages 16, 18 and 20 are approached to prevent turbulence from being induced in the flow of the compressed gas by an otherwise sudden increase or decrease in the flow area upon the gas flowing into and from an intercooler 34, 36 and 38 or for that matter after-cooler 40. Although not illustrated, the interiors of the inlet sections 54 and the outlet sections 56 can be provided with vanes to further inhibit pressure loss due to turbulent flow.

As mentioned previously, after-cooler 40 has the same conceptual design as intercoolers 34, 36 and 38. As such, it also is provided with pairs of inlet and outlet conduits 46 and 48, formed by inlet and outlet sections 50 and 52, respectively, and inlet and outlet transition sections 54 and 56 to prevent turbulence from being introduced into the flow of compressed gas. As such, the discussion above with respect to the intercoolers 34, 36 and 38 is equally applicable to the after-cooler 40 with respect to the inlet and outlet sections 46 and 48 and the transition sections 54 and 56 is equally applicable.

Figure 2:
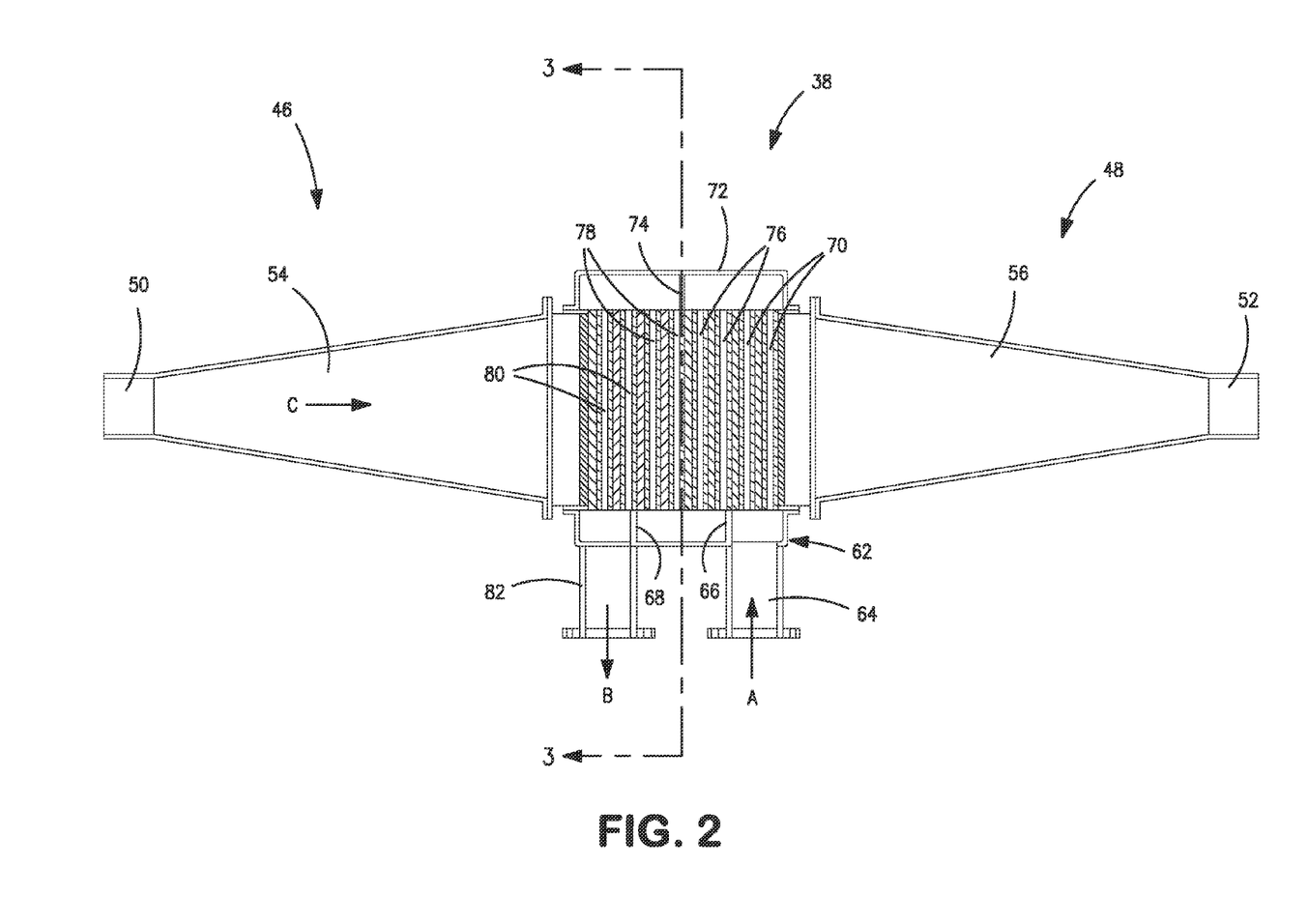
FIG. 2 is a sectional view of FIG. 1 taken along line 2-2 of FIG. 1.

With reference to FIG. 2, intercooler 38 is illustrated for exemplary purposes. Intercoolers 34 and 36 and after-cooler 40 are of the same design and the following discussion is equally applicable to such components. Intercooler 38 is provided with a box-like housing 60. Coolant fluid, which would be water in case of compressed air as the gas to be compressed, is admitted into an inlet plenum 62 by way of a flanged inlet 64. Inlet plenum 62 is provided with baffles 66 and 68. Baffle 66 constrains the coolant fluid to flow through passages 70 in the direction of arrowhead "A" and then into a reverse plenum 72 having a baffle 74 to cause the flow to reverse direction and flow through passages 76. The flow reverses direction within inlet plenum 62 and then flows through passages 78 and into reverse plenum 72 on the other side of baffle 74. The flow then reverses direction again and flows into passages 80 and into the inlet plenum due to baffle 68. The flow is discharged from a flanged outlet 82 in a direction of arrowhead "B". With additional reference to FIG. 3, the compressed gas flows in cross-flow to the coolant fluid in a direction of arrowhead C into finned passages 84 to indirectly exchange heat with the coolant fluid flowing in cross-flow. As is apparent from the Figures, intercooler 38 can be fabricated from conventional brazed aluminum plate fin heat exchanger construction. In this regard, intercooler 38 is sealed at the top and the bottoms by top and bottom plates 83 and 85, respectively.

Figure 3:
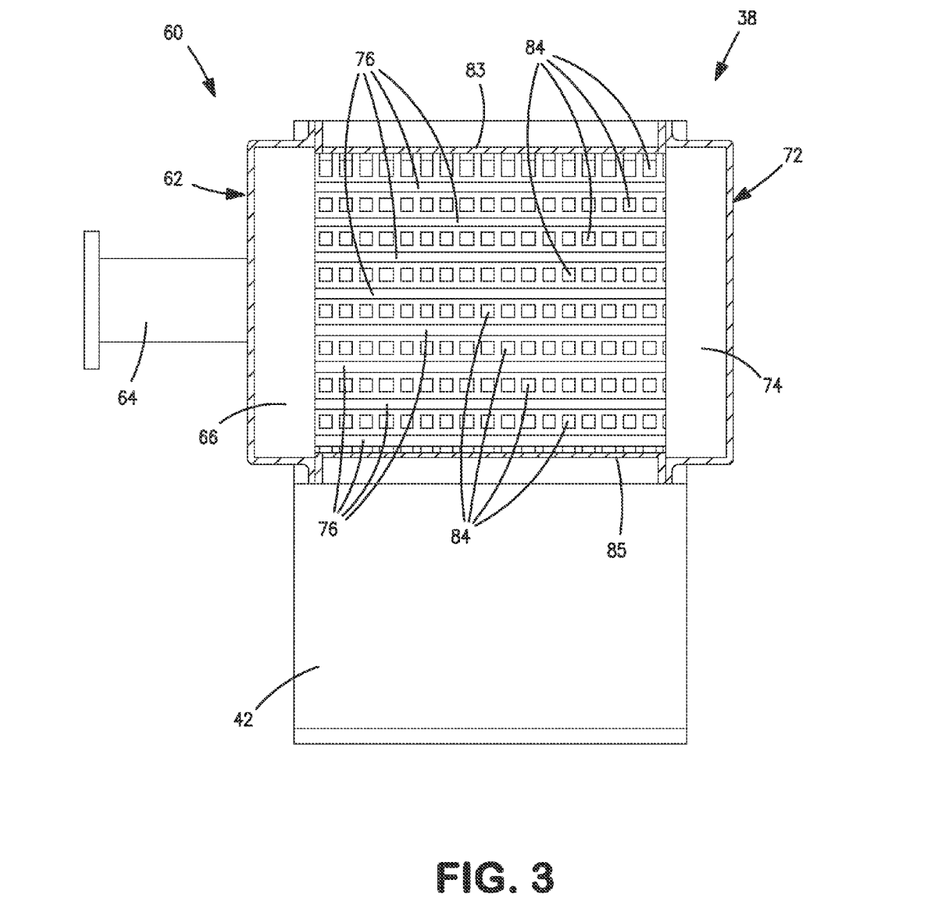
FIG. 3 is a sectional view of FIG. 2 taken along line 3-3 of FIG. 2.

As is apparent from FIGS. 1-3, it can be seen that inlet and outlet transition sections 54 and 56 are formed from a four sided polyhedron having a configuration similar to a frustum of a cone. In this regard, if the intercooler 34 were provided with a housing of cylindrical configuration instead of the illustrated box-like configuration, the inlet and outlet sections 54 and 56 would in fact be of conical configuration having a circular transverse cross-section in place of the rectangular cross-section utilized for inlet and outlet transition sections 54 and 56 are of rectangular cross-section that matches the cross-section of the passages 84, the flow is able to be evenly distributed to the passages 84 that solves mal-distribution problems seen in prior art intercoolers in which there exists a sudden increase in cross-sectional area at the connection of the inlet and outlets to the intercooler.

With reference again to FIG. 1, it can be seen that the pairs of inlet and outlet conduits 46 and 48 between compression stages 18 and 20 is also provided with elongated sections 86 and 88 so that the pairs of inlet and outlet conduits 46 and 48 are sized longer than the pair of inlet and outlet conduits 46 and 48 associated with compression stages 14 and 16 and 18 and the after-cooler 40. This allows the compressor arrangement 1 to be of spiral-like configuration so that the forth compression stage 20 is outwardly spaced from the first of the compression stages 14 and the first compression stage does not interfere with the outlet conduit 48 associated with the after-cooler 40 and the piping network used in the apparatus that employs the compression arrangement 1 of which a pipe 90 is illustrated. This is necessary given the rectilinear configuration of the compressor arrangement 1. In this regard, the elongated sections 86 and 88 could be placed between any of the two compression stages 14, 16; 16, 18; and 18, 20. Moreover, if more than four compression stages were desired, the compression stages could spiral around those illustrated in compressor arrangement 1.

Figure 4:
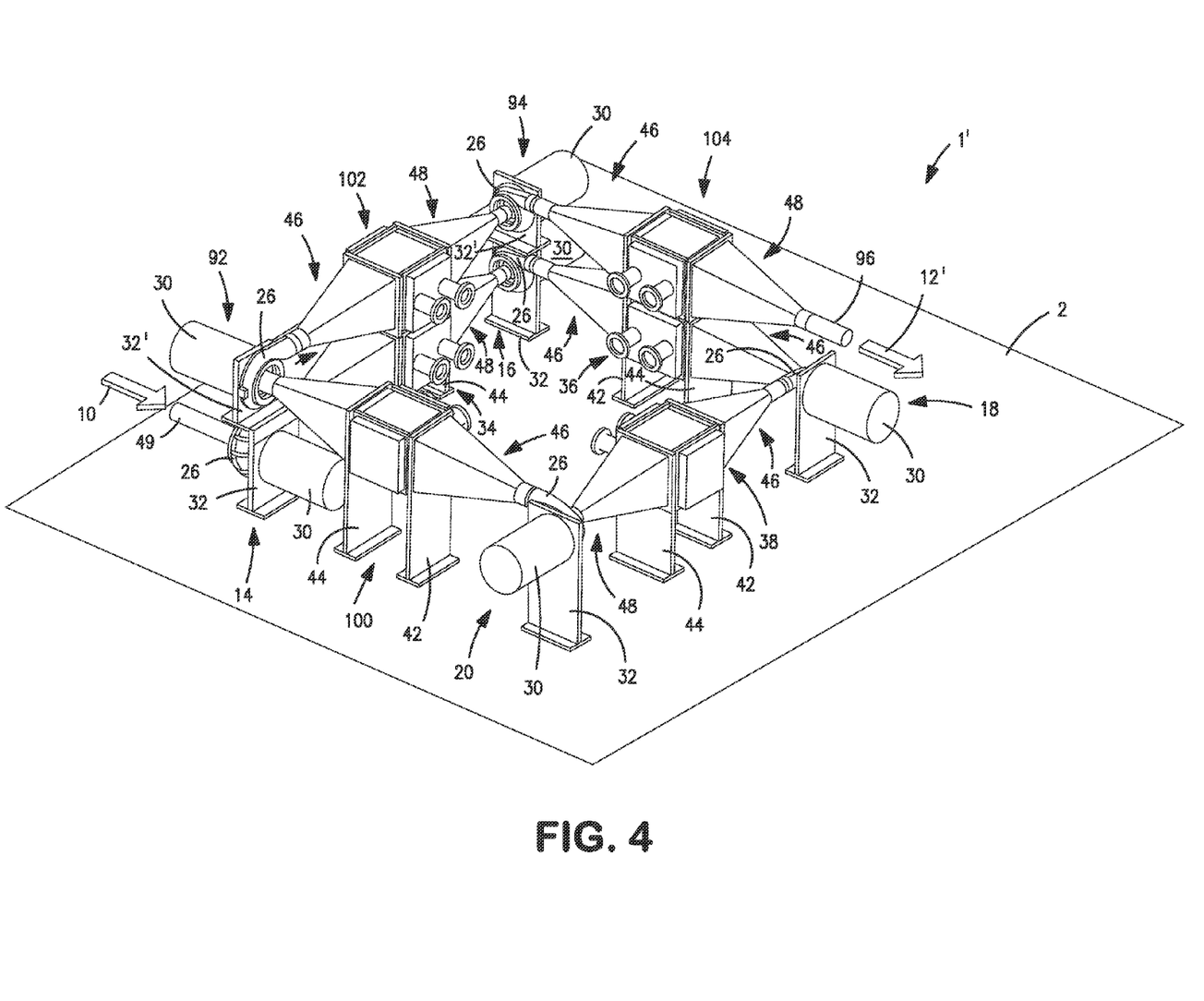
FIG. 4 is a perspective view of an alternative embodiment of the present invention.

Other configurations are possible. For instance with reference to FIGS. 4 and 5, a multistage compressor installation 1' is illustrated in which the compression stages are arranged in a helical configuration to provide two or more levels of compression stages. In this regard, the gas stream 10 is compressed in compression stages 14, 16, 18 and 20 with interstage heat removal by means of intercoolers 34, 36 and 38 as illustrated and described with respect to FIG. 1. Additionally, compression stage 20 discharges compressed gas to intercooler 100 and in turn compression stage 92. In the embodiment shown in FIG. 1, it is to be recalled that compression stage 20 discharged compressed gas to after-cooler 40. Compressed gas is discharged from compression stage 92 to intercooler 102 and then to compression stage 94 and after-cooler 104 to produce a compressed gas stream 12' that is discharged from a pipe 96 at a higher pressure than compressed gas stream 12 produced in multistage compression installation 1'. The description of compression stages 92 and 94, intercoolers 100 and 102 and after-cooler 104 are the same as set forth above for compression stages 14-20, intercoolers 34-38 and after-cooler 40, respectively. Therefore, the reference numbers for the individual elements have been deleted from FIGS. 4 and 5 for ease of explanation. The compression stages 92 and 94, however, would be designed for a specific pressure rise and flow rate contemplated for such stages.

Figure 5:
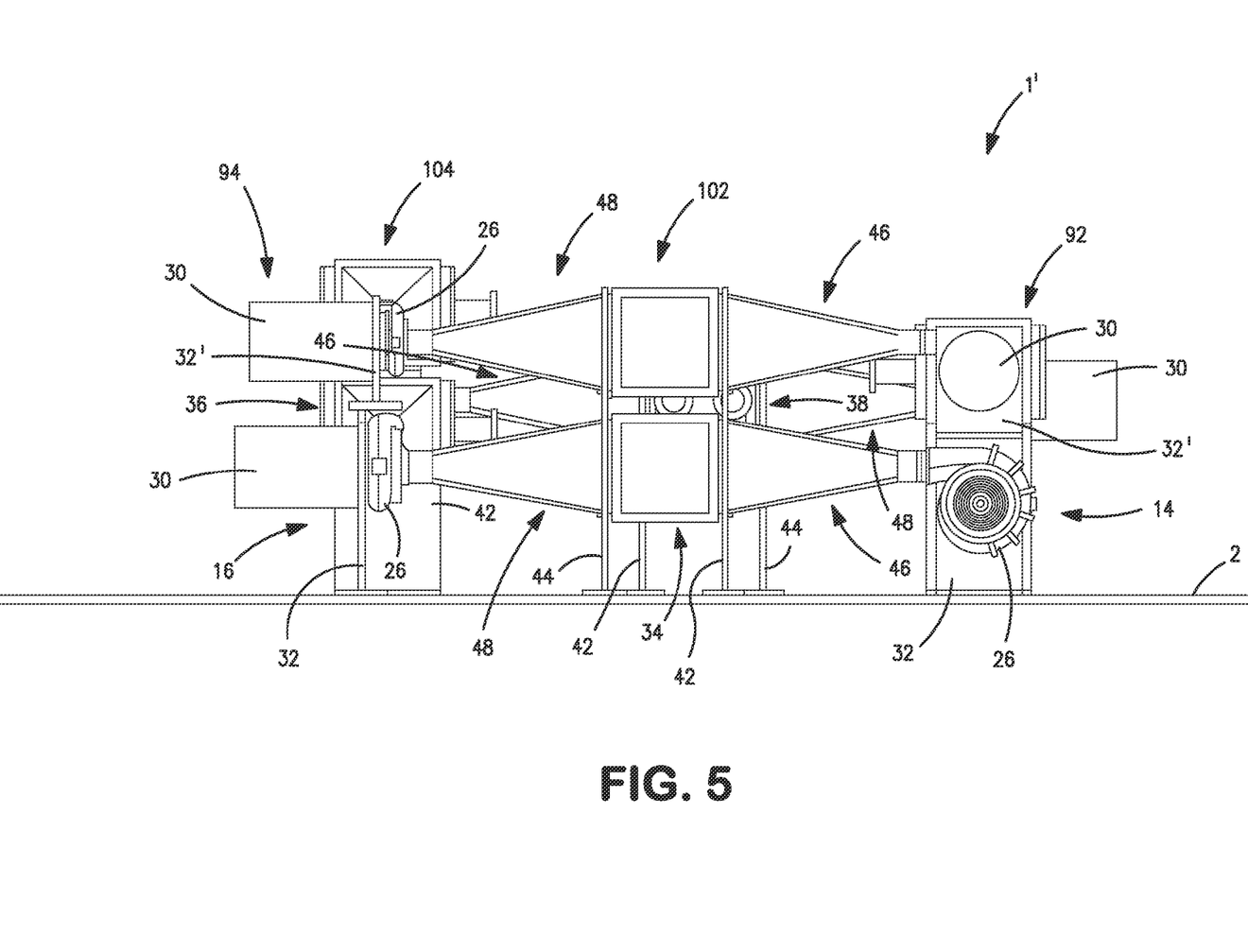
FIG. 5 is a rear elevational view of FIG. 4.

With particular reference to FIG. 5, the helical configuration of the multistage compressor installation is produced by suitably orienting the volutes 26 to be opposite to the inlets 24 and to produce a slight rise in elevation of successive stages. For example, the volute 26 associated with compression stage 18 is oriented so that its associated outlet 28 lies above the inlet 24 associated with such compression stage. In FIG. 1, the volute 26 associated with compression stage 18 is mounted to its associated compressor 22 so as to be rotated 360° from its position in FIG. 4. The volutes 26 associated with all of the compression stages of multistage compressor installation 1' are similarly mounted. As a result, there is an increase in the height of compression stage 16 in an amount of equal to the distance between the inlet 24 and the outlet 28 of the volute 26 since the inlet 24 is centrally located in each of the volutes 24. The same holds true for all of the other compression stages following compression stage 16 such that compression stages 92 and 94 are located above compression stages 14 and 16, respectively and are mounted by connection of supports 32' onto supports 32 associated with the compression stages 14 and 16. Put another way, the helical configuration provided within compressor installation 1' is produced by orienting the volutes 26 so that the outlets 28 are located above the inlets 24. Another possibility would be to orient the volutes 26 at a slight angle and if necessary, slightly increase the lengths of the inlet and outlet conduits around the helical configuration of compression stages. This might be necessary where the volutes have too small a diameter to produce the necessary rise in the height of the stages.

Figure 6:
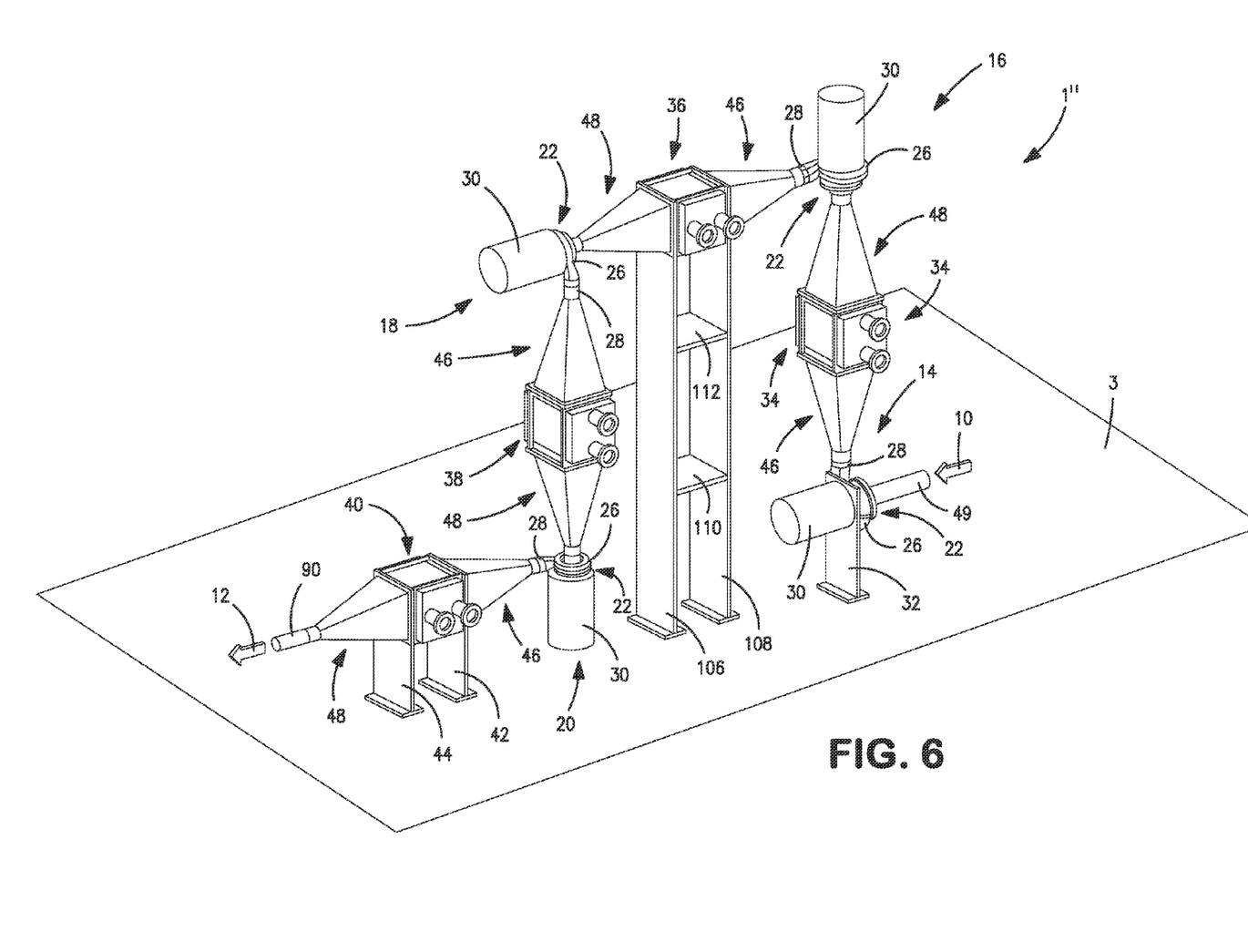
FIG. 6 is a perspective view of another alternative embodiment of the present invention.

With reference to FIG. 6, a multistage compressor installation 1" is illustrated in which a second and third compression stages 16 and 18 are located above a first and a fourth of the compression stages 14 and 20 such that the compression stages 14, 16, 18 and 20 are all situated in a plane that is vertical from the horizontal. Again, since the inlet and outlet conduits 46 and 48 and the intercoolers 34, 36 and 38 and after-cooler 40 have been fully described above, reference numbers indicating the individual elements thereof have not been included in this Figure since the same have been fully described above. This type of configuration has a narrow footprint that might be necessary given other equipment of a facility that employs multistage compressor installation 1". As could be appreciated additional stages could be supplied along side the four illustrated compression stages by utilizing the after-cooler 40 as an intercooler oriented at right angles to the plane and then orienting other compression stages in another parallel vertical plane. The mounting for compression stage 14 and after-cooler 40 on the concrete slab 3 by way of supports 42 and 44, respectively. The other stages are mounted by means of supports 106 and 108 connected to intercooler 36. Supports 106 and 108 are connected by cross members 110 and 112. It is to be noted that compression stages 16, 18 and 20 could also be mounted on a wall adjacent to the concrete slab 3 by individual supporting elements.

It is to be noted that the multistage compressor installations 1, 1' and 1" might be employed without the inlet and outlet conduits 46 and 48 having the respective transition sections 54 and 56. However, as could be appreciated, the pressure drop and therefore the energy consumption of such a facility would be greater in such installations.

While the present invention has been described with reference to preferred embodiments, as could be appreciated by those skilled in the art that numerous changes and omissions could be made without departing from the spirit and scope of the inventions as set forth in the appended claims.

We claim:

1. A multistage compressor installation comprising:
a plurality of compression stages, including at least four compression stages, to compress a gas and intercoolers positioned between the compression stages to remove heat of compression from the gas between compression stages;
each of the compression stages comprising a centrifugal compressor and a driver configured to independently drive the centrifugal compressor of each of the compression stages, each of the centrifugal compressors having an inlet surrounded by a volute and the volute having an outlet oriented so as to discharge compressed gas at a right angle to the inlet;
pairs of conduits connecting the intercoolers to the compression stages;
the compression stages, the intercoolers and the pairs of conduits arranged such that an inlet of a successive stage of the compression stages is located opposite to an outlet of a preceding stage of the compression stages relative to each intercooler therebetween and conduits of each of the pairs of the conduits are substantially in an in-line relationship to inhibit pressure drops in the conduits; and
the compression stages arranged in a helical-like configuration on at least two separate planes.

2. The multistage compressor installation of claim 1, wherein the helical-like configuration is produced by orienting the volute of each of the compression stages such that the outlet is located above the inlet.

\* \* \* \* \*